United States Patent [19]
Nykiforuk

[11] Patent Number: 5,927,649
[45] Date of Patent: Jul. 27, 1999

[54] SUSPENDIBLE CARRIER FOR CARRYING MULTIPLE CARGO LOADS BY HELICOPTER

[76] Inventor: Donald Terry Nykiforuk, P.O. Box 6099, Alberta T9N 2G7, Bonnyville, Canada

[21] Appl. No.: 08/813,197

[22] Filed: Mar. 7, 1997

[51] Int. Cl.⁶ .................................................. B64D 1/08
[52] U.S. Cl. .................................. 244/118.1; 244/137.4; 294/82.26
[58] Field of Search .............................. 244/137.4, 137.1, 244/118.1; 294/82.24, 82.26, 82.3, 82.19, 82.31; 258/1.2, 1.4, 1.6, 1.8

[56] References Cited

U.S. PATENT DOCUMENTS

| | | |
|---|---|---|
| 1,994,782 | 3/1935 | Olson . |
| 2,904,369 | 9/1959 | Campbell . |
| 3,127,133 | 3/1964 | Glatfelter et al. . |
| 3,158,357 | 11/1964 | Campbell . |
| 3,227,401 | 1/1966 | Currier . |
| 3,946,971 | 3/1976 | Chadwick . |
| 4,523,746 | 6/1985 | Chapman ................................. 258/1.2 |
| 5,593,113 | 1/1997 | Cox . |

*Primary Examiner*—Charles T. Jordan
*Assistant Examiner*—Tien Dinh
*Attorney, Agent, or Firm*—McFadden, Fincham

[57] ABSTRACT

A suspendible carrier is provided for receiving and carrying cargo from an aircraft. A detachable ground assembly releasably engages cargo to the carrier, and has a coupling means consisting of an elongate vertically-oriented shank having a coupling, such as a widened head, at its upper end. A pylon or other support structure holds the coupling in a vertical position prior to pickup by the helicopter. A cargo suspension assembly is suspended from the cable, and has a coupling engagement apparatus to releasably engage the coupling. The coupling engagement apparatus has a receiving portion to engage the coupling and a retaining portion to retain the coupling. The receiving portion may consist of a panel hinged with a one-way hinge to the engagement apparatus. The coupling is transported from the receiving portion to the retainer portion, preferably by maintaining the coupling engagement apparatus in a rearwardly-tilted orientation to permit couplings to slide towards the retainer portion. A release mechanism selectively and individually releases couplings from the suspension assembly. Preferably, the cargo suspension assembly has an elongate shape adapted to retain multiple cargo carriages. The cargo release mechanism may comprise a release arm and a keeper, both of which are pivotally mounted to the suspension assembly and engageable with a coupling. The release arm pivots to a discharge position to discharge a single coupling while the keeper prevents rearward travel of further couplings. In the retainer position, the keeper permits rearward travel of coupling units to the release arm, and the release arm engages a single coupling and prevents its release.

25 Claims, 10 Drawing Sheets

SUSPENDIBLE CARRIER FOR CARRYING MULTIPLE CARGO LOADS BY HELICOPTER

FIELD OF THE INVENTION

The invention relates to a suspendible carrier for picking up and carrying multiple loads of cargo from a helicopter.

BACKGROUND OF THE INVENTION

Carriers for use with helicopters are commonly used for moving cargo loads in remote areas. At their most basic, such devices comprise a cable suspended from a helicopter, with a grapple hook at the end of the cable for engagement with a cargo load. This arrangement requires a ground crew to attach the hook to the cargo load as the helicopter waits. This can be a hazardous and manpower-intensive job. Also, this arrangement is not capable of carrying multiple loads, since the multiple cable lines could tangle. It is desirable to provide a means to pick up multiple loads of cargo without ground assistance at the time of pickup. This permits a number of loads to be prepared on the ground in advance, over a period of time, with the loads all being picked up at one pass by a helicopter.

Various solutions have been proposed to permit pickup without the use of a ground crew. For example, U.S. Pat. No. 4,523,746 (Chapman) proposes a coupling device that attaches to the end of the hoist cable, which mates with a corresponding coupling device attached to the cargo load. The coupling device on the load extends generally vertically upwardly, and permits a skillful helicopter pilot to engage the load by simply lowering the helicopter directly over the cargo package until the two coupling means engage. This arrangement requires a skillful pilot, and does not permit the carrying of multiple loads.

For this application, it is important that the coupling means be relatively simple to engage, to permit a pilot of average skill to engage a load from the air. This need may be met by having the coupling means extend generally upwardly above a pylon so that it is easily accessible to the helicopter pilot.

A means for achieving the requirements identified above is to provide a system with a detachable load coupling arrangement with a coupling means that detachably engages a carrier suspended from a helicopter. There may be further included a shroud or sack for wrapping the load for further protection.

The carrier that comprises the subject of this invention is specifically intended for use with a helicopter, but may be readily adapted for use with any other type of hovering aircraft such as a powered blimp, balloon or dirigible.

SUMMARY OF THE INVENTION

It is an object of this invention to provide a suspendible carrier for receiving and carrying cargo from an aircraft, that provides a coupling means that is relatively easy to engage from the air and that is adapted to carry multiple cargo loads.

The invention comprises in its broadest aspect a carrier for suspension of a load from an aircraft, comprising:
a) a cable or other attachment means engageable to a helicopter or other hoverable aircraft;
b) a detachable ground assembly that releasably engages cargo to the carrier. The ground assembly comprises a coupling means engageable to the cargo load. The coupling means comprises an elongate vertically-oriented shank having a widened head or other coupling member at its upper end. An attachment means, such as a cable, releasably connects the coupling means to the cargo. A pylon or other support structure may be releasably engaged to the coupling means, to hold the coupling means in a vertical position prior to pickup by the helicopter;
c) a cargo suspension assembly suspendible from a second end of the cable. This assembly comprises a support structure and a coupling engagement means at the lower face of the structure for releasably engaging the coupling. The coupling engagement means comprises an elongate structure defined by a receiving portion and a retaining portion, the receiving portion is adapted to engage the coupling member and the retaining portion is adapted to retain the coupling member of the ground assembly. The suspension assembly further comprises transport means to transport the coupling means from the receiving portion to the retainer portion, and release means to release the coupling means from the carrier assembly.

Preferably, the cargo suspension assembly has an elongate shape adapted to retain multiple cargo carriages. The flanges in this version extend generally the length of the housing and the flanges consist first and second regions at respective ends of the housing. The first region comprises a coupling engagement region wherein the flanges are hinged to swing inwardly into the interior of the housing to admit the head of the coupling into the interior of the housing while preventing the release of the head. The second region comprises a retainer region wherein the flanges are rigidly attached to the housing and retain one or more coupling means. Transport means transport the coupling means from the first to the second regions. The transport means is most easily provided by providing the hoist with a geometry and weight distribution that permits the flanges to slope downwardly from the first to the second regions when the hoist is suspended from a helicopter, sufficient to permit a coupling means to slide towards the second region when suspended from the hoist.

A ground assembly may be guided into the suspension assembly during pickup by means of a skirt depending from the suspension assembly and which flares outwardly and downwardly.

The cargo release means may comprise a release arm and a keeper both of which are pivotally mounted to the suspension assembly and engageable with a coupling means. The release arm pivots to a discharge position to discharge a single coupling while the keeper prevents rearward travel of further couplings. In the retainer position, the keeper permits rearward travel of coupling units to the release arm, and the release arm engages a single coupling and prevents its release.

The invention further comprises a method for carrying and sequentially engaging and releasing multiple cargo loads by an aircraft. The method comprises in its broadest aspect the steps of employing the apparatus described above in the following manner (a) lowering the suspension assembly towards the ground assembly, and contacting ground with the rear legs to tilt the suspension assembly upwardly and at the same time pivoting the suspension assembly to position said suspension assembly above the coupling means;

(b) engaging the coupling means to the front portion of the suspension assembly and raising the suspension assembly whereby the coupling means slides to the rear portion to be retained as a result of the weight distribution of the suspension assembly; and (c) flying the ground assembly to a second location and releasing the ground assembly from the suspension assembly by actuating the release means.

The terms "front" and "forward" as used herein refer to the end of the assembly which receives a cargo load and which when the device is suspended from a helicopter corresponds to the front of the helicopter, and the term "rear" refers to the opposing end.

It will be further understood that the terms "rope", "cable", "chain" and "line" are used generally interchangeably, and other attachment means may also be used. As well, the terms "helicopter" and "aircraft" refer to any hoverable aircraft such as a blimp or the like.

DETAILED DESCRIPTION OF THE PREFERRED EMBODIMENTS

Figure 1:
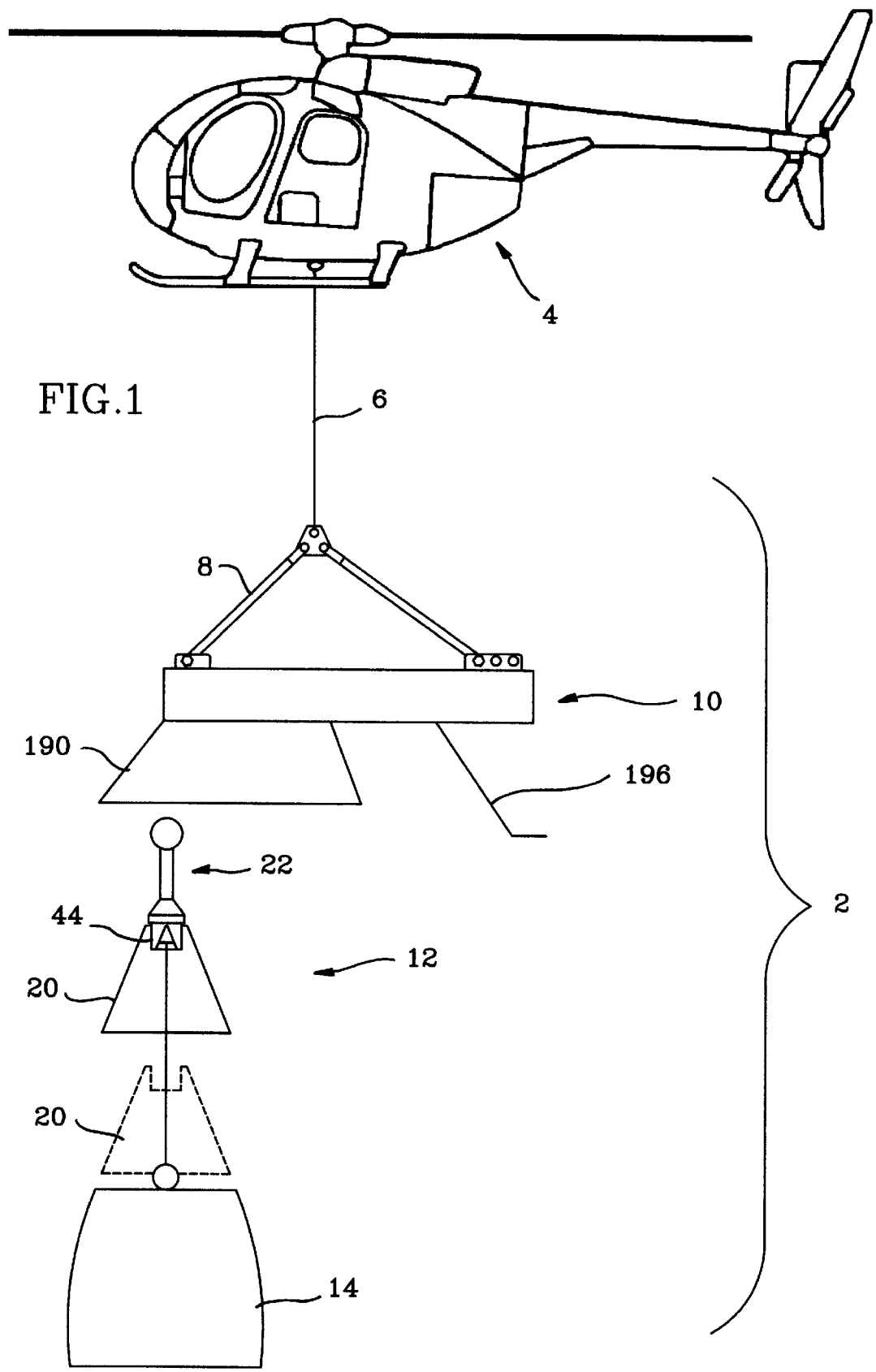
FIGS. 1 and 2 are perspective views of the carrier suspended from a helicopter.
Figure 2:
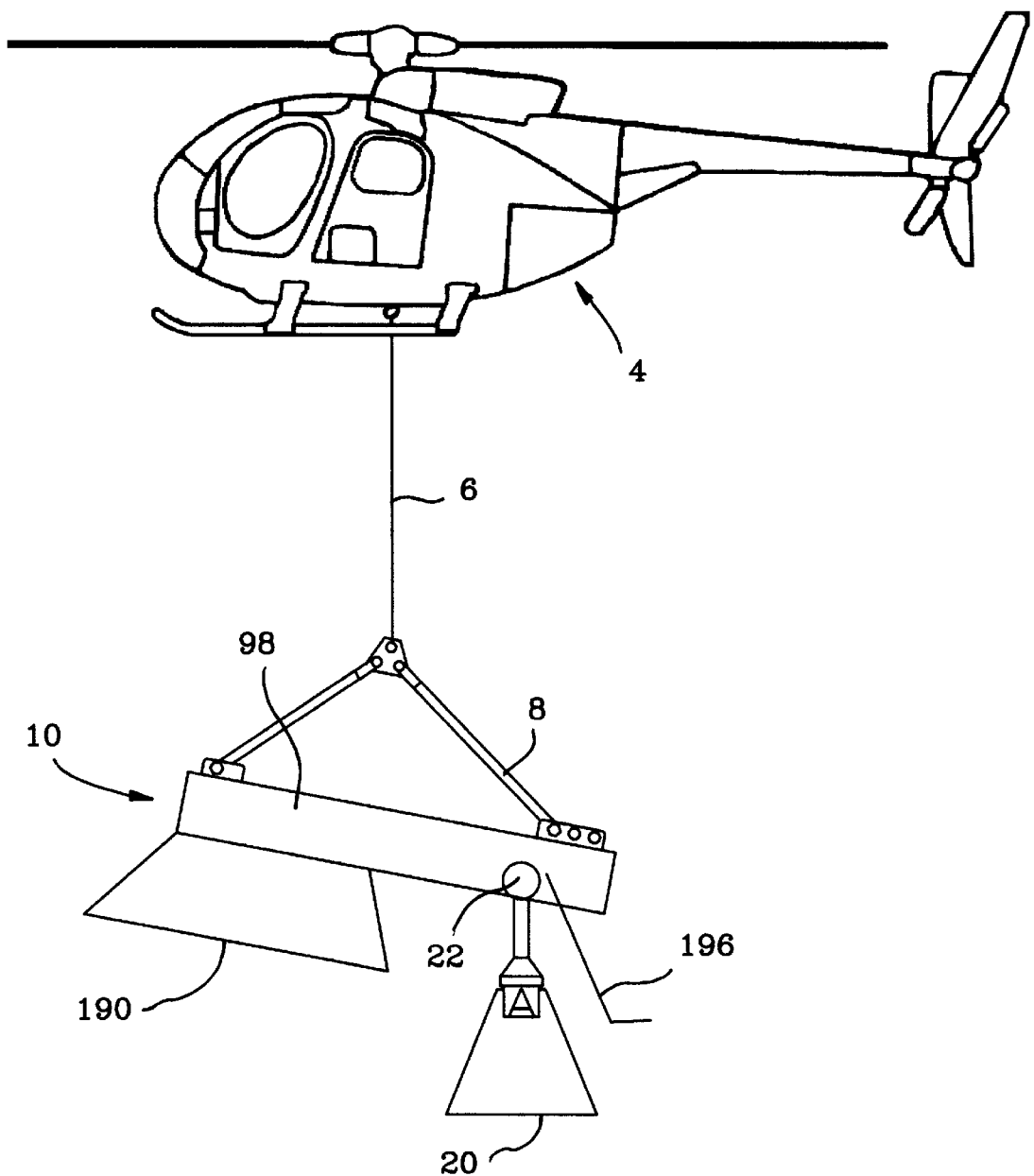
Figure 3:
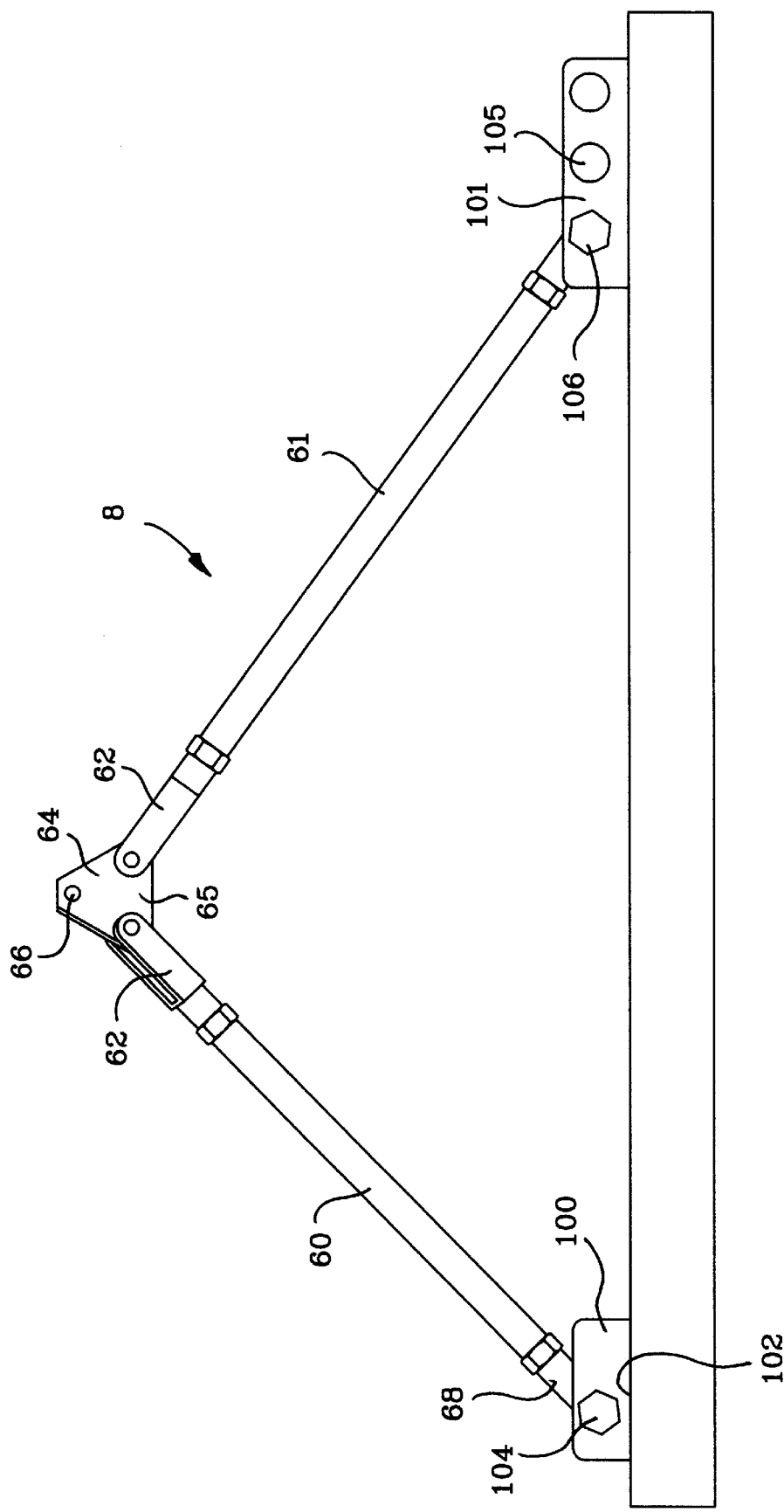
FIG. 3 is a side elevational view of the support frame.

Referring to FIGS. 1 and 2, a carrier 2 is shown suspended from a helicopter 4. The carrier 2 comprises in general terms a main suspension cable 6; a support frame 8 suspended from the cable 6; a cargo suspension assembly 10 mounted to the frame 8; and a detachable ground assembly 12. A cargo load 14 on the ground is prepared prior to pickup by attaching it to the ground assembly 12, following which it is received by the suspension assembly 10 as the helicopter 4 is lowered over the load 14. The suspension assembly 12 is designed to sequentially pick up multiple loads, each of which is engaged to a separate ground assembly 12 and to release the cargo loads 14 in the order in which they were picked up.

The various components of the system will now be described in detail, by reference to FIGS. 1–10.

Figure 7:
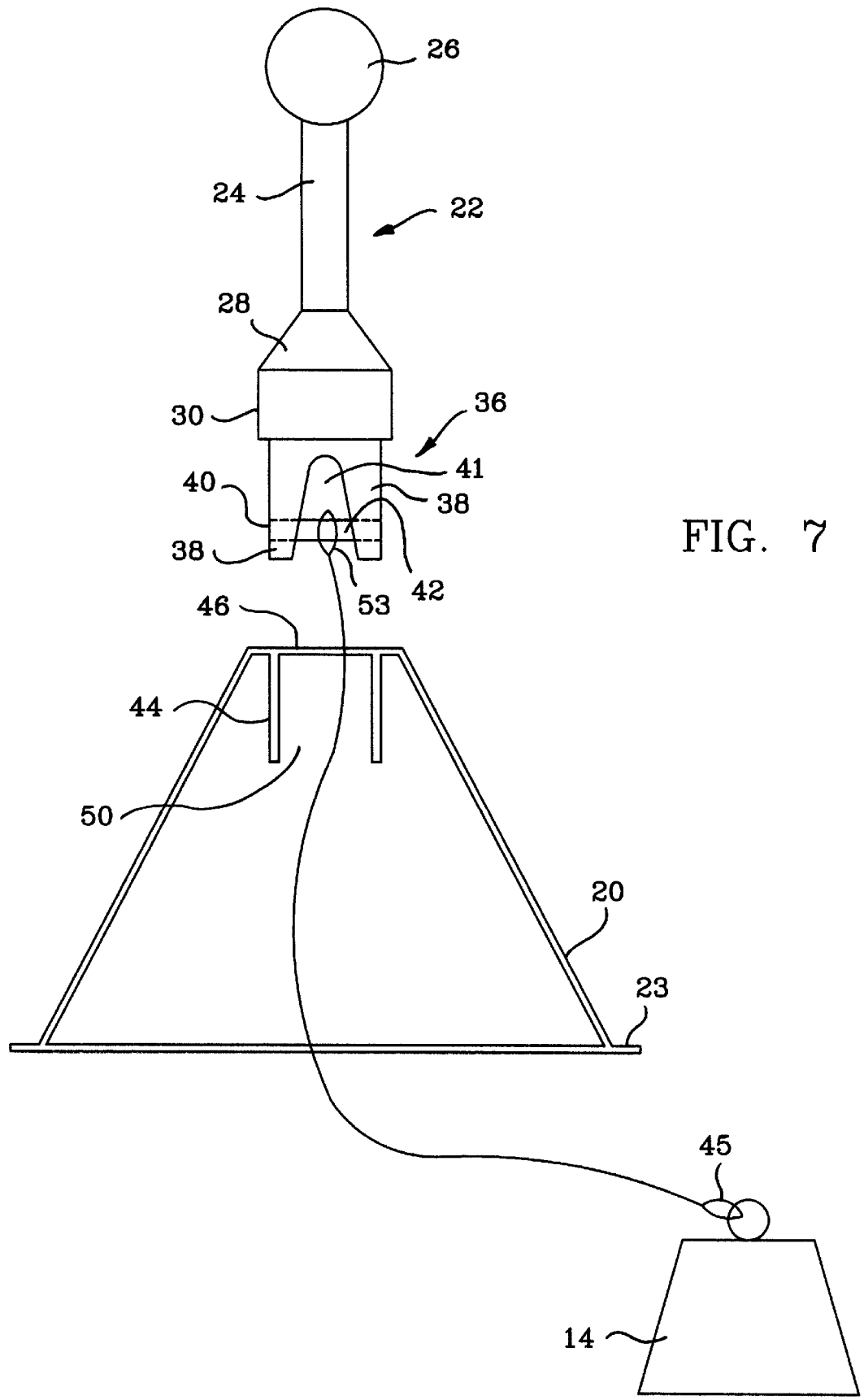
FIG. 7 is an exploded view of the ground assembly.

The ground assembly 12, shown in FIG. 7, comprises a pylon 20 and a coupling 22. The pylon 20 serves as a detachable support to hold the coupling in a generally vertical position, and has the shape generally of an inverted, open-bottomed cone. A ledge 23 comprises the lower rim of the pylon 20 and provides a ground contact surface. The coupling 22 is detachably engaged to the pylon 20 and the cargo 14, as will be described below. The coupling 22 comprises a shank 24, having at its upper end a coupling member in the form of a widened head that may comprise a ball or disk 26. At its lower end, the shank 24 terminates in an outwardly-flared portion 28, the bottom face of which defines a shoulder 30. The cargo 14 is linked to the coupling 22 by a bifurcated attachment assembly 36 which depends downwardly from the lower face of the shoulder 30, and includes a pair of legs 38 spanned at their lower end by a pin 40. The legs 38 and pin 40 define an opening 41. The pin 40 is housed within a sleeve 42 that spins freely about the pin 40 to journal a rope or cable 45 being drawn through the opening 41.

The attachment assembly 36 fits within a receptacle 44 recessed into the upper end of the pylon 20 and having an upper rim 46. The receptacle 44 releasably retains the coupling 22 and holds it in a generally vertical position. As the attachment assembly 36 is lowered into the receptacle 44, the shoulder 30 contacts the rim 46 to limit the travel of the coupling 22 into the pylon 20. Therefore, the pylon 20 provides a stable structure for retaining the coupling 22 in a generally upwardly vertical position. The receptacle 44 has an open bottom 50 to permit a rope, cable or chain 45 from the cargo 14 to engage the coupling 22.

In use, the cargo 14 (shown here not to scale) is placed on the ground adjacent to the pylon 20. A cable or rope 45 is wrapped or otherwise engaged to the cargo 14 and the cable is sufficiently long to thread its free end through the pylon 20. The rope is passed under the ledge 23 and threaded upwardly through the aperture 50, and an openable loop 53 at the end of the cable 45 is fastened to the pin 40. The rope 45 should be of sufficient length so that, during cargo pick up, the coupling 22 slides to the rear of the suspension assembly before the helicopter pulls upwardly on the cargo 14. When the ground assembly 12 is ready for pickup, the coupling 22 is positioned within the receptacle 44. When the ground assembly 12 is picked up, the pylon falls away from the coupling 22 and slides down the rope 45 to rest against the load 14, as shown by the broken lines in FIG. 1.

Turning to the support frame 8 and cargo suspension assembly 10, these elements are shown in detail in FIGS. 3–6. The support frame 8, illustrated in FIG. 3, comprises an angled arm formed from first and second limbs 60 and 61, respectively, that meet at an elbow 64. The elbow 64 comprises a generally triangular plate to which each of the limbs 60, 61 are pivotally engaged by means of a yoke 62 at the end of each limb, with a pin 65 linking each yoke with the elbow. An aperture 66 extends through the elbow 64 at its apex to accept an attachment for linking the support frame to the cable 6. The lower ends of the limbs 60, 61 comprise a plate like structure having an aperture extending therethrough to accept a mounting pin for attaching the support 8 to the cargo suspension assembly 10. The limbs 60, 61 both pivot freely at either end to permit the geometry of the support frame to be changed to adapt to different requirements.

The support frame 8 and cargo suspension assembly 10 are designed with a weight distribution and geometry that tilts the device rearwardly, even when a typical cargo load is engaged at the front of the device, thus permitting the cargo 14 to slide rearwardly once it has been engaged. This is achieved by having the first limb 60 shorter in length than the second limb 61.

Figure 4:
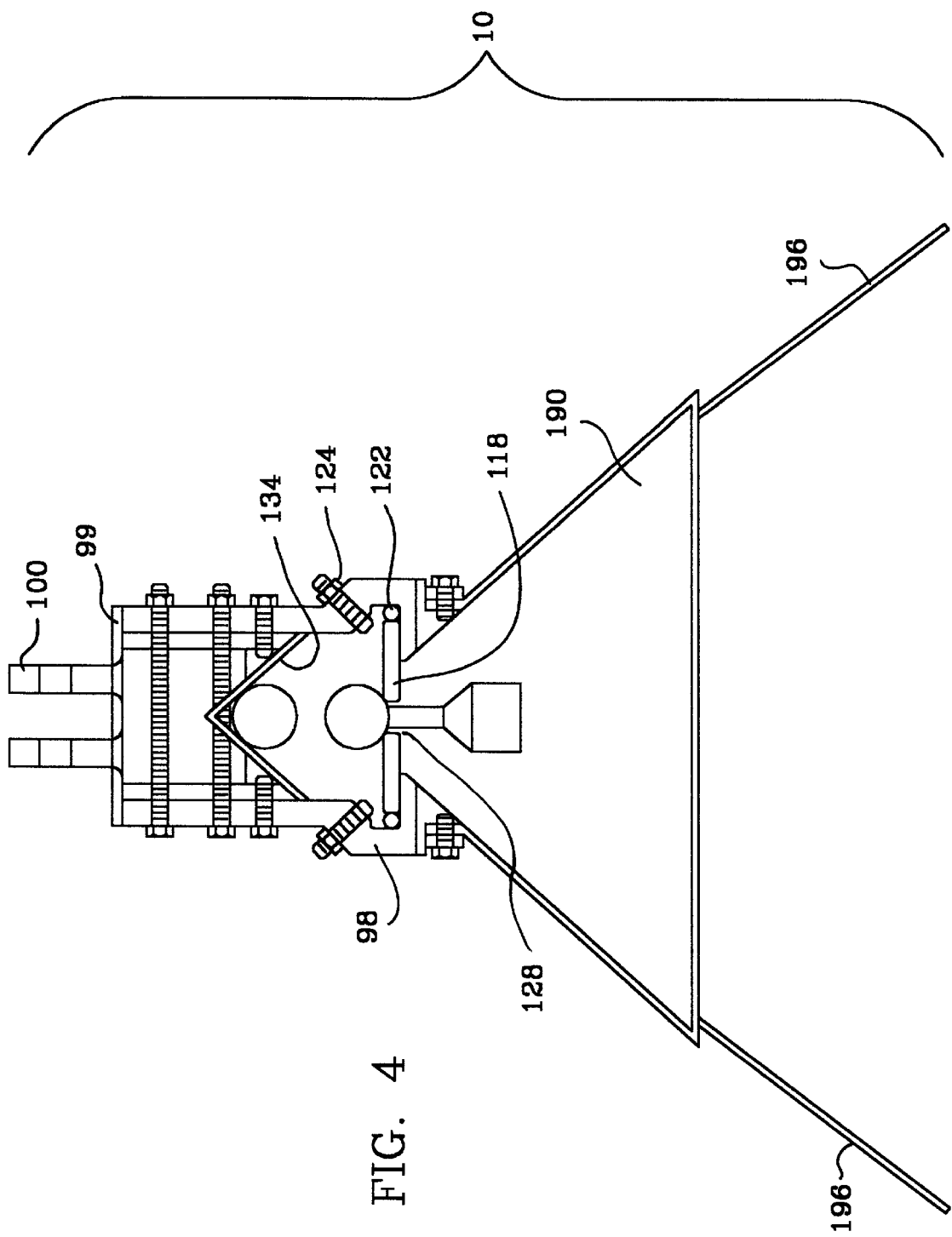
FIG. 4 is a front view of the cargo suspension assembly.
Figure 5:
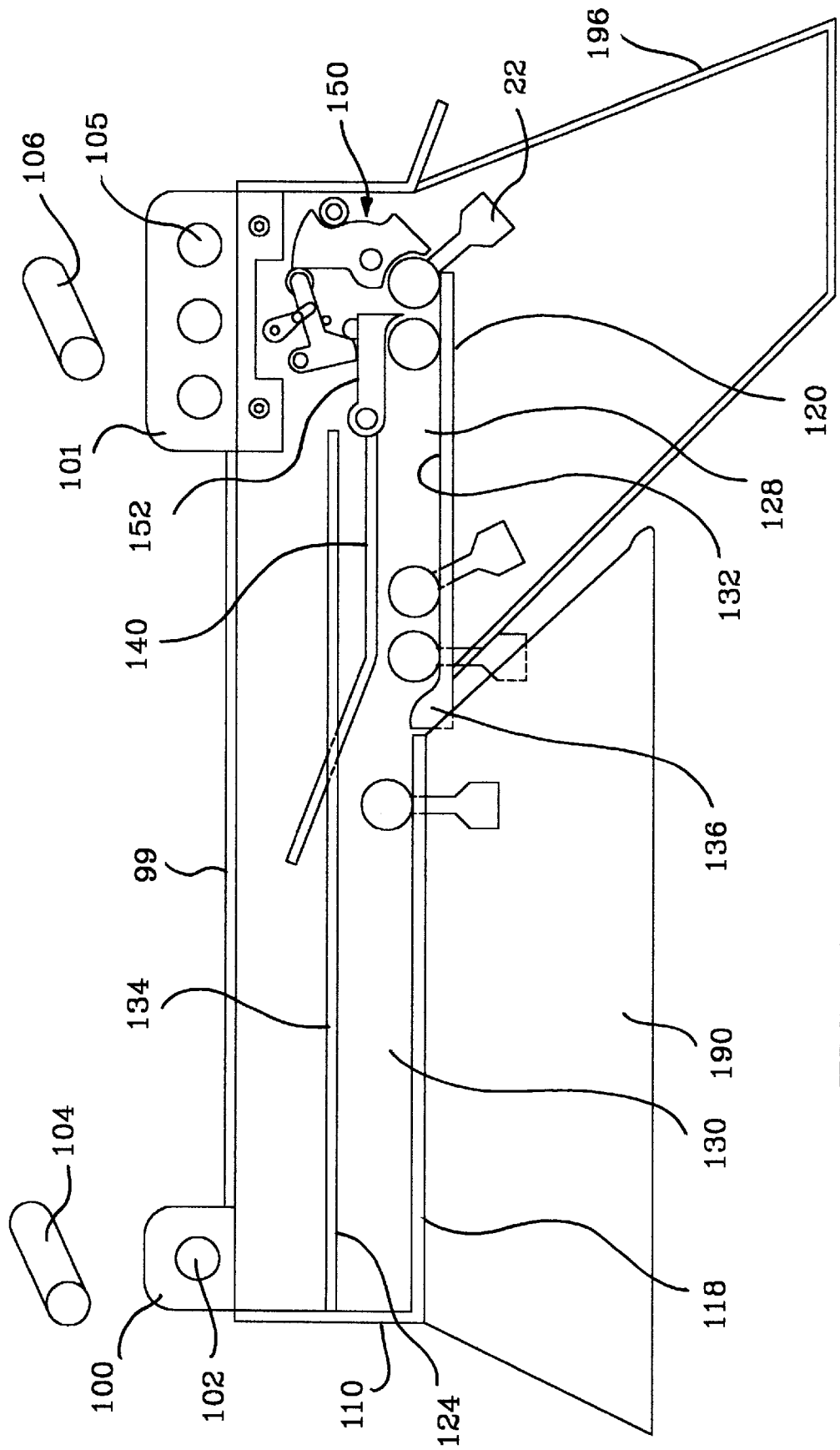
FIG. 5 is a side elevational view of the cargo suspension assembly.
Figure 6:
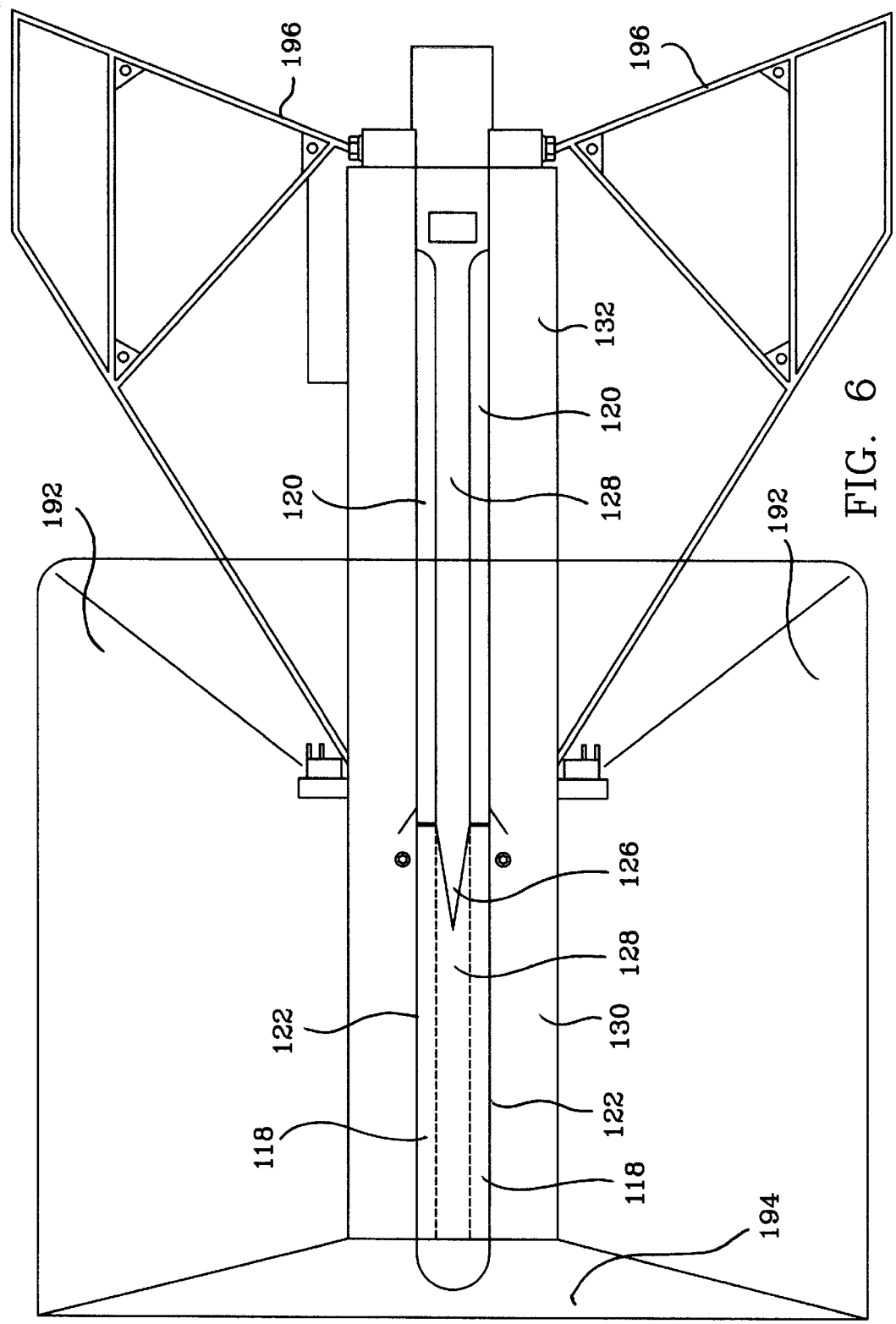
FIG. 6 is a bottom plan view of the cargo suspension assembly.

The cargo suspension assembly 10 is shown in FIGS. 4–6. The assembly is housed with an elongate housing 98, which is capped by a top cover plate 99. Front and rear fins 100, 101 extend upwardly from the cover plate, and are pivotally engaged to the support frame 8. An aperture 102 extends through the front fin 100 and permit it to be releasably engaged to the support frame 8 by means of a pin 104. The rear fin 101 may include an array of apertures 105 to adjustably engage the support frame 8 thereto by means of pin 106. A coupling receiving assembly 110 is housed within the housing 98.

The lower face of the housing, as best seen in FIG. 6, is open and is characterized by front and rear sets of flanges 118 and 120, respectively. The flanges extend longitudinally along the housing, and partly cover the lower face of the housing. The front flanges are each hinged to a corresponding side at the housing with a pivotal attachment comprising hinge 122 that permit the front flanges to swing upwardly into the interior of the housing, but not downwardly below the horizontal plane.

The upward swing of the flanges 118 is limited by one or more adjustable flange stops 124, seen in FIG. 4, mounted to the housing and positioned to contact each flange at its position of desired maximum upward travel. Downward rotation of the flanges 118 is limited to a substantially horizontal position by shoulders 123. Thus, the flanges 118 may be rotated upwardly by the action of a coupling head 26 contacting the flanges and urging them upwardly, and after passage of the coupling head 26 upwardly through the slot defined by the flanges 118, the flanges 118 then proceed to rotate downwardly via gravity acting thereon, until they abut the shoulders 123 to form opposed ledges which are spaced to support the head 26 while permitting the shank 24 to extend therebetween, thus supporting the coupling from the flanges. The rear flanges, which define a coupling retainer region, are rigidly mounted to the housing and do not swing relative to the housing.

The front and rear flanges are offset, such that the rear flanges lie on a plane below that of the front flanges. A step 126 between the front and rear flanges permits a coupling to drop from the front to the rear flanges, while inhibiting travel in the reverse direction. The exposed side edges of the front and rear flanges are spaced apart and define a slot 128 between the flanges 118, 120 that extends the length of the housing 98. The slot 128 is comprised of front and rear portions 130 and 132, respectively, correspond with the front and rear sets of flanges. The front portion 130 comprises a coupling pickup region. The hinged flanges 118 at this region accept a head 26 of a coupling 22, with the hinges 122 comprising retraction means that permit the flanges to retract to permit the head 26 to be inserted through the slot 128. A coupling guide 134 shaped like an inverted trough extends the length of the housing above the flanges 118, 120 to limit upward movement of a coupling as the carrier is lowered onto the coupling. When the coupling receiving assembly 110 is lowered against an upwardly-extending coupling 22, the coupling head 26 is guided by the flange 118 into this portion of the slot 128. The flanges 118 swing inwardly and the coupling head 26 enters the interior of the housing 98 until the coupling 22 abuts the guide. As the shank 24 enters the slot 128, the flanges 118 swing back downwardly via gravity, and the coupling head 26 is retained within the interior of the housing 98.

The rear portion 132 of the slot 128 comprises a retainer portion and permits one or more couplings to be retained while additional couplings are engaged in the coupling pickup region. The step down from the engagement to the retainer portion prevents a coupling from sliding back into the front portion. Following attachment of a coupling 22 by the pickup region, the ground assembly 12 slides rearwardly as a result of the slope of the suspension assembly to the rear and is retained within this rear portion. A deflection guide 136 is provided to direct the coupling 22 from the front portion 130 toward the rear portion 132, and it also serves to prevent the coupling 22 from jamming in the front portion. A rear guide 140 extending rearwardly from the deflection guide is provided.

Figure 8:
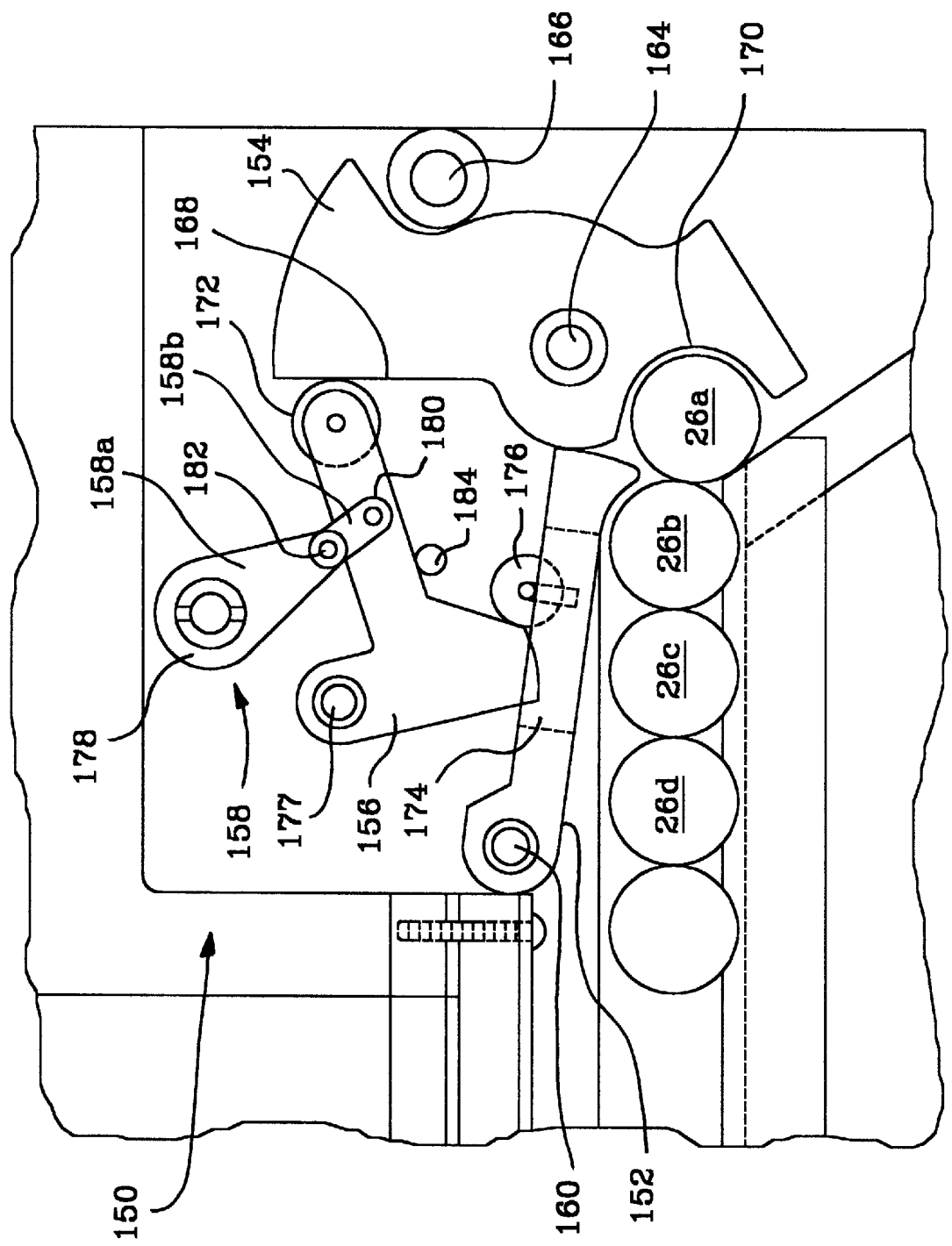
FIG. 8 is a side view of the release mechanism in the retainer position.
Figure 9:
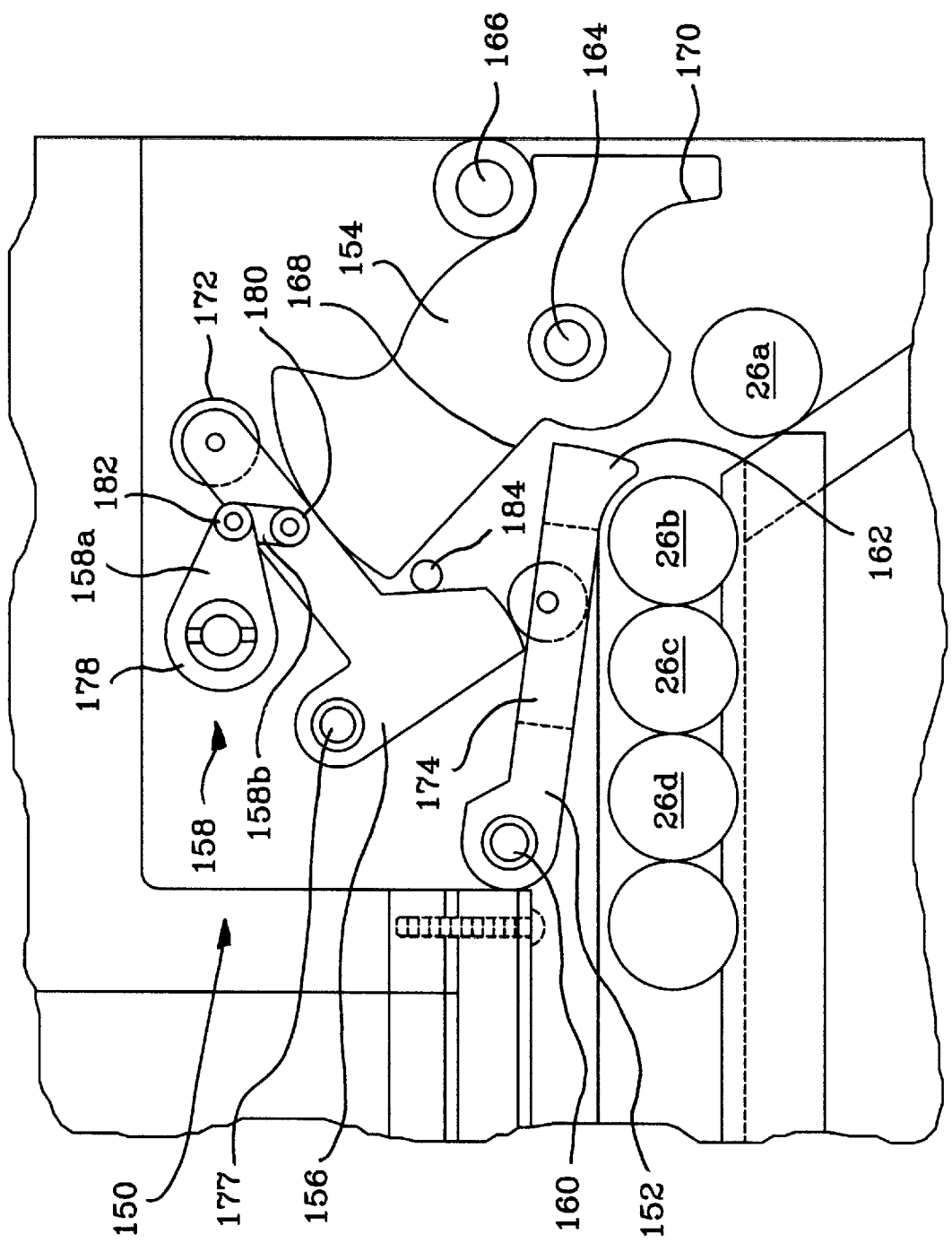
FIG. 9 is a side view of the release mechanism in the release position.

The couplings 22, and their associated cargo loads 14, are released one at a time by a release mechanism 150 best seen in FIGS. 8 and 9. The release mechanism is housed within the rear portion of the housing 98, and is remotely controlled by the helicopter pilot. The release mechanism is switchable between a retainer position, seen in FIG. 8, and a release position, seen in FIG. 9.

The release mechanism comprises in general terms a pivotally-mounted keeper 152 that permits coupling units to one at the time be released to a release arm 154. The release arm swings in the vertical plane when actuated to discharge an individual coupling from the carrier. The keeper 152 and the release arm 154 are both actuated by a pivoting lock arm 156, that in turn is actuated by a rotating bell crank 158.

The keeper is an elongate, generally horizontally-oriented arm. The keeper is pivotally mounted at its forward end to the housing 98 by a keeper pivot 160. The rearward end of the keeper is characterized by a downwardly-extending foot 162, which when the keeper is in the lowered position of FIG. 9 prevents couplings 22 from sliding past the keeper.

The release arm is pivotally mounted to the housing 98 at about the midpoint of the arm, by way of pivot mount 164. A stop 166 limits the travel of the release arm. The forward face of the release arm is characterized at its upper end by a flat section 168 that engages the lock arm 156, as will be described below. The middle region of the forward face bows outwardly to engage the foot 162 of the keeper. The lower region 170 is concave to receive the head 26 of a coupling 22.

The lock arm 156 is generally L-shaped, and is pivotally mounted to the housing 98 by means of pivot 177. A lock arm roller 172 is rotatably mounted to a first free end of the lock arm, and is positioned to contact the flat section 168 of the release arm 154. The second free end of the lock arm engages the keeper, and slides within a groove 174 within the upper face of the keeper. A keeper roller 176, rotatably mounted within the keeper 152, engages the second free end of the lock arm. The keeper roller slides vertically within a pair of channels.

The bell crank 158 drives the lock arm between the two positions shown in FIGS. 8 and 9. The bell crank comprises a folding arm comprised of first and second limbs 158(a) and (b), linked by an elbow 182 and having a first end 178 pivotally mounted to the housing 98 and a second end 180 pivotally mounted to the lock arm. The elbow 182 slideably engages the upper face of the lock arm. The second limb 158(b) is shorter in length than the first limb 158(a), permitting the bell crank to be configured into an over-center position when rotated clockwise.

The operation of the release mechanism will now be described.

In the retainer position shown in FIG. 8, the keeper 152 is in a raised position, and rearward travel of couplings is prevented by the release arm. The head 26 a of a first coupling 22(a) is cradled within the concave lower region 170 of the release arm and subsequent heads 26(b),(c), and (d) lie upstream of head 26(a). The release arm is held in a generally vertical position by the lock arm roller 172. The bell crank 158 holds the lock arm in a generally horizontal position by the elbow 182 of the bell crank contacting the lock arm, with the bell crank being folded into a over-center position. Downward travel of the lock arm is limited by a lock arm stop 184.

Release of a single coupling is initiated by a signal from the pilot, which triggers a reciprocating motor (not shown) mounted outside the housing to rotate the bell crank in the counterclockwise direction (in the view seen in FIGS. 8 and 9). As seen in FIG. 9, this causes the bell crank to fold, rotating the lock arm counterclockwise. Elevation of the lock arm roller to a position above the release arm permits the release arm to rotate counterclockwise by the pressure of the coupling 22(a) against the lower end of the release arm. The first coupling 22(a) is thus released from the carrier. The counterclockwise rotation of the lock arm also simultaneously forces the keeper down, with the result that the couplings 22(*b*), (*c*), and (*d*) cannot slide rearwardly past the keeper.

After the coupling 22(*a*) has been discharged, the pilot disengages the power from the reciprocating motor, causing the release mechanism to revert to the position shown in FIG. 8.

Turning to FIGS. 5 and 6, a skirt 190 extends downwardly from the bottom face of the housing 98 at the front region thereof. The skirt comprises a pair of side plates 192 and a front plate 194 that flare outwardly from the base of the housing 98. The outward flaring of the skirt matches the shape of the pylon 20. As the cargo suspension assembly 10 is lowered over the carriage assembly 12 during a pickup operation, the skirt 190 guides the coupling 22 towards the slot 128 to engage the head 26 of the coupling within the slot 128.

Rear legs 196 depend downwardly from the rear of the housing 98, and extend to a position lower than the bottom edge of the skirt 190. Each of the legs is fastened on a respective side of the suspension assembly 10 and contacts the ground as the suspension assembly is lowered to tilt the device forwardly. The legs also implant into the ground to permit the pilot to maneuver the front end of the device into position over the coupling 22, by using the rear legs 196 as a pivot after the rear legs have contacted the ground. Once the coupling 22 is engaged, the helicopter rises causing the ground assembly 12 to elevate and tilts rearwardly as a result of its weight distribution, causing the coupling 22 to slide rearwardly within the slot 128. With sufficient slack in the rope 45, the coupling 22 will slide into the retainer region as the helicopter rises before the load is engaged. This permits the carrier to retain its rearward tilt as the load is being picked up.

Figure 10:
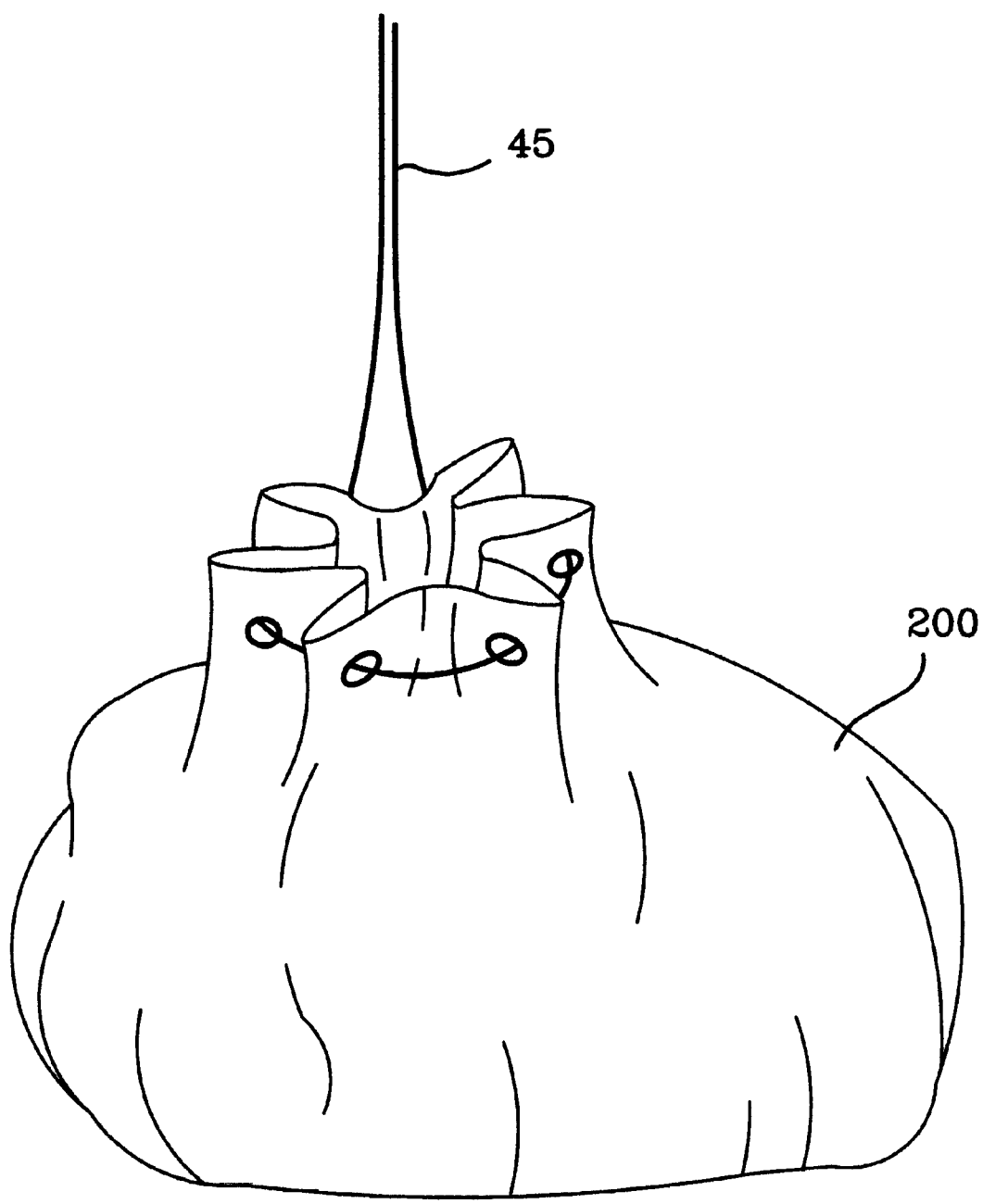
FIG. 10 is a front elevational view of the envelope portion of the ground assembly.

There may be further provided a wrapper 200, seen in FIG. 10, for insulating a cargo load 14. The cargo load 14 is wrapped inside the envelope prior to assembly of the load to the coupling 22. The wrapper 200 may comprise simply a tarp with grommets or D-rings along its edges, with a rope or cord to tie the tarp into a bundle.

While the foregoing embodiment of the invention have been described and shown, it is understood that various alternatives and modifications may be made thereto and fall within the scope of the invention as defined in the appended claims.

I claim:

1. A carrier for suspension of a cargo load from an aircraft, comprising:
    a) a ground assembly comprising a support structure, a coupling member having an enlarged head supported on a shank forming a neck member, and means to releasably engage said coupling member to a cargo load;
    b) an airborne assembly suspendible from an aircraft, comprising an elongate frame, coupling member pickup means at a first end of said frame, coupling member retaining means at a second end of said frame, and transport means to convey said coupling members from said first end to said second end following pickup of said ground assembly by said carrier, said pickup means comprising a pair of elongate parallel flanges mounted to said frame and spaced apart to define a slot therebetween, at least one of said flanges being hinged to said frame for pivotal movement upwardly to a first position wherein said slot is widened sufficiently to permit passage of said head through said slot, said pivotal movement permitting downward rotation of said at least one flange to a second position limited by a stop means wherein said slot is narrowed sufficiently to prevent downward release of said head whereby said coupling member is suspended by said head from said pickup means; and
    c) cable means to suspend said airborne assembly from an aircraft.

2. A carrier as in claim 1, wherein said frame is disposed at an angle forming a downward slope from said first end to said second end when said airborne assembly is suspended from an aircraft, sufficient to permit said coupling means to slide by action of gravity towards said second end.

3. A carrier as in claim 1, wherein there is further provided a front skirt depending from said airborne assembly to provide a ground contact for said cargo suspension assembly and to guide said coupling means into said coupling member pickup means.

4. A carrier as in claim 1 wherein there is further provided at least one rear leg depending from the rear of said airborne assembly, said at least one rear leg providing ground contact means to elevate said rear of said airborne assembly during load pickup and discharge operations.

5. A carrier as in claim 1, wherein said ground assembly includes a support to hold the coupling means in a generally vertical position.

6. A carrier as in claim 5, wherein said support includes an aperture for receiving said coupling means whereby said support is detachable from said coupling means, and detaches therefrom when said ground assembly is engaged by said suspension assembly.

7. A carrier as in claim 6, wherein said support comprises an inverted generally cone-shaped member having a receptacle at the upper end of said frame member to releasably receive said coupling means.

8. A carrier as in claim 1, further comprising release means to sequentially release said coupling members from said second end of said airborne assembly, comprising a release arm pivotally mounted to said suspension assembly, said release arm engageable at a first end with a first of said coupling member to control the release thereof, and a keeper pivotally mounted to said airborne assembly and engageable with a second said coupling member, wherein said release arm pivots to a discharged position to discharge said first coupling member while said keeper prevents rearward travel of further of said coupling members and to a retainer position wherein said keeper permits rearward travel of said second coupling member to said release arm.

9. A carrier as in claim 8 wherein rotation of both said keeper and said release arm is controlled by a lock arm, opposing ends of which contact said release arm and said keeper respectively, said lock arm being pivotally mounted to said airborne assembly and rotatably driven by a motor.

10. A carrier as in claim 9, wherein the keeper comprises an elongate, generally, horizontal member having a downwardly-extending foot at one end thereof to obstruct passage of couplings.

11. A carrier as in claim 10, wherein said release arm has a lower end defined by a concave portion for releasably cradling said first coupling, and an upper end adapted to slideably engage said lock arm.

12. A carrier as claimed in claim 1, wherein said pickup means and said retaining means respectively comprise first and second pairs of flanges, said first and second pairs of flanges each being disposed about a common vertical plane, said first and second pairs of flanges further being aligned to permit said coupling member to be conveyed from said pickup means to said retaining means.

13. A carrier for suspension of multiple cargo loads from an aircraft, comprising:
    a) at least two ground assemblies each comprising a support structure, a coupling member having an enlarged head supported on a shank comprising a neck member, and means to releasably engage said coupling member to a cargo load;

b) an airborne assembly suspendible from an aircraft comprising an elongate frame, coupling member pickup means at a first end of said frame, coupling member retaining means at a second end of said frame, and transport means to convey said coupling members from said first end to said second end following pickup of each of said ground assemblies by said carrier, said pickup means comprising a pair of elongate parallel flanges mounted to said frame and spaced apart to define a slot therebetween, at least one of said flanges being hinged to said frame for pivotal movement upwardly to a first position wherein said slot is widened sufficiently to permit passage of said head through said slot, said pivotal movement permitting downward rotation of said at least one flange to a second position limited by a stop means wherein said slot is narrowed sufficiently to prevent downward release of said head whereby said coupling member is suspended by said head from said pickup means;

c) release means associated with said airborne assembly to sequentially release each of said ground assemblies from said second end; and d) cable means to suspend said airborne assembly from an aircraft.

14. A carrier as in claim 13, wherein said frame is disposed at an angle forming a downward slope from said first end to said second end when said airborne assembly is suspended from an aircraft, sufficient to permit said coupling means to slide by action of gravity towards said second end.

15. A carrier as in claim 13, wherein there is further provided a front skirt depending from said airborne assembly to provide a ground contact for said airborne assembly and to guide said coupling means into said coupling engagement means.

16. A carrier as in claim 13, wherein there is further provided at least one rear leg depending from the rear of said airborne assembly, said at least one rear leg providing ground contact means to elevate said rear of said airborne assembly during load pickup and discharge operations.

17. A carrier as in claim 13, wherein said ground assembly includes a support to hold the coupling means in a generally vertical position.

18. A carrier as in claim 17, wherein said support includes an aperture for receiving said coupling means whereby said support is detachable from said coupling means, and detaches therefrom when said ground assembly is engaged by said suspension assembly.

19. A carrier as in claim 18, wherein said support comprises an inverted generally cone-shaped member and said support means comprises a receptacle at the upper end of said frame member to receive said coupling means.

20. A carrier as in claim 13, further comprising release means to sequentially release said coupling members from said second end of said airborne assembly, comprising a release arm pivotally mounted to said suspension assembly, said release arm engageable at a first end with a first said coupling member to control the release thereof, and a keeper pivotally mounted to said airborne assembly and engageable with a second said coupling member, wherein said release arm pivots to a discharged position to discharge said first coupling member while said keeper prevents rearward travel of further, of said coupling members and to a retainer position wherein said keeper permits rearward travel of said second coupling member to said release arm.

21. A carrier as in claim 20, wherein rotation of both said keeper and said release arm is controlled by a lock arm, opposing ends of which contact said release arm and said keeper respectively, said lock arm being pivotally mounted to said suspension assembly and rotatably driven by a motor.

22. A carrier as in claim 21, wherein the keeper comprises an elongate, generally, horizontal member having a downwardly-extending foot at one end thereof to obstruct passage of couplings.

23. A carrier as in claim 22, wherein said release arm has a lower end defined by a concave portion for releasably cradling said first coupling, and an upper end adapted to slideably engage said lock arm.

24. A carrier as claimed in claim 13, wherein said pickup means and said retaining means respectively comprise first and second pairs of flanges, said first and second pairs of flanges each being disposed about a common vertical plane, said first and second pairs of flanges further being aligned to permit said coupling member to be conveyed from said pickup means to said retaining means.

25. A method for sequentially picking up and discharging multiple cargo loads from an aircraft, comprising the steps of:

a) providing a carrier comprising first and second ground assemblies each associated with a cargo load and comprising a coupling member having an enlarged head supported on a neck member; an airborne assembly comprising an elongate frame, coupling member pickup means at a first end of the frame, coupling member retaining means at a second end of the frame, said pickup means comprising a pair of elongate parallel flanges mounted to the frame and spaced apart to define a slot therebetween, with at least one of the flanges being hinged to the frame for pivotal movement upwardly to a first position wherein the slot is relatively widened, and downwardly to a second position wherein the slot is relatively narrowed; release means for selectively releasing a first of said ground assemblies from said second end; and a cable means to suspend the airborne assembly from an aircraft;

b) supporting each coupling member on the ground within a generally vertical position wherein the head forms the upper end thereof;

c) lowering the airborne assembly on a first ground assembly, whereby the coupling member head contacts the pickup means;

d) rotating the at least one flange upwardly, by lowering the airborne assembly relative to the coupling member, to permit the head to pass through said slot;

e) rotating the at least one flange downwardly, to narrow the slot sufficiently to restrict release of the coupling member head from the pickup means;

f) elevating the airborne assembly, thereby suspending the first ground assembly and cargo load therefrom;

g) conveying the first ground assembly to the second end of the airborne assembly;

h) repeating steps c through g with a second of said ground assemblies and cargo loads;

i) releasing the first said ground assembly and cargo load from the second end by actuating the release means.

\* \* \* \* \*